US007224679B2

(12) United States Patent
Solomon et al.

(10) Patent No.: US 7,224,679 B2
(45) Date of Patent: May 29, 2007

(54) DYNAMIC UPDATE OF QUALITY OF SERVICE (QOS) PARAMETER SET

(75) Inventors: Eitan Solomon, Rishon Lezion (IL); Lior Ophir, Herzlia (IL)

(73) Assignee: Texas Instruments Incorporated, Dallas, TX (US)

( * ) Notice: Subject to any disclaimer, the term of this patent is extended or adjusted under 35 U.S.C. 154(b) by 870 days.

(21) Appl. No.: 10/435,223

(22) Filed: May 10, 2003

(65) Prior Publication Data

US 2003/0214905 A1 Nov. 20, 2003

Related U.S. Application Data

(60) Provisional application No. 60/379,502, filed on May 10, 2002.

(51) Int. Cl.
*H04Q 7/24* (2006.01)
(52) U.S. Cl. ............ 370/338; 370/395.21; 370/395.43; 370/445; 370/447; 370/448; 455/452.25
(58) Field of Classification Search ..................... None
See application file for complete search history.

(56) References Cited

U.S. PATENT DOCUMENTS

| | | | |
|---|---|---|---|
| 5,450,616 A * | 9/1995 | Rom ............................ 455/69 |
| 5,768,531 A | 6/1998 | Lin |
| 6,434,132 B1 * | 8/2002 | Ishii et al. .................. 370/338 |
| 6,643,278 B1 * | 11/2003 | Panasik et al. ............. 370/330 |
| 6,760,319 B1 * | 7/2004 | Gerten et al. ............... 370/335 |
| 6,810,019 B2 * | 10/2004 | Steudle ........................ 370/252 |
| 6,967,944 B2 * | 11/2005 | Choi ........................... 370/348 |
| 7,113,745 B2 * | 9/2006 | Khayrallah ................ 455/41.2 |
| 2002/0155811 A1 * | 10/2002 | Prismantas et al. ........... 455/63 |

OTHER PUBLICATIONS

Ophir, Lior, "Normative Text for Supporting Dynamic Update of the QoS Parameter Set," IEEE 802.11-02/341r0, May 13, 2002, pp. 1-4.
Gummalla, Ajay Chandra V., et al., "Wireless Medium Access Control Protocols," IEEE Communications Surveys, www.comsoc.org/pubs/surveys, Second Quarter 2000, pp. 2-15.

(Continued)

*Primary Examiner*—Steve M. D'Agosta
(74) *Attorney, Agent, or Firm*—Steven A. Shaw; W. James Brady; Frederick J. Telecky, Jr.

(57) ABSTRACT

The present invention provides a system, method, and apparatus for providing improved quality of service in a wireless local area network transmission system, the network comprising at least two devices, the quality of services defined at least in part by data communicated by a first of the devices to other devices in the network through one or more quality of service parameters. In accordance with the present invention, a change indicator is initialized at the start of a monitoring period. Then, during the monitoring period, the stored parameters are monitored for changes in those of thee stored parameters that define the quality of service. When a change is detected, the change indicator is updated in response and other devices in the network are periodically notified of the current value of the change indicator. The other devices are operable to update locally stored quality of service parameters in response to detecting a change in the change indicator.

10 Claims, 3 Drawing Sheets

OTHER PUBLICATIONS

Mangold, Stefan, et al., "IEEE 802.11e—Fair Resource Sharing Between Overlapping Basic Service Sets," Proceedings of the PIMRC 2002, Lisbon, Portugal, Sep. 2002, 9 pages.

Munoz, Lui, et al., "Optimizing Internet Flows Over IEEE 802.11b Wireless Local Area Networks: A Performance-Enhancing Proxy Based on Forward Error Correction," IEEE 2001, www.comsoc.org, 16 pages.

Parks, Gregory, "802.11e Makes Wireless Universal," Network World Fusion, Mar. 12, 2001, www.nwfusion.com/news/tech/2001/0312tech.html, pp 1-3.

Lough, Daniel L., et al. "A Short Tutorial on Wireless LANs and IEEE 802.11," The Bradley Department of Electrical and Computer Engineering, Virginia Polytechnic Institute and State University, Blacksburg, Virginia; www.computer.org/students/looking/summer97/ieee802.htm, pp. 1-5, 1997.

Lin, Yin-Dar, et al., "An Investigation into DFC MAC Protocols: Mechanisms, Implementation, and Research Issues," IEEE Communications Surveys, www.comsoc.org/pubs/surveys, Third Quarter 2000, pp 2-13.

Karaoguz, Jeyhan, "High-Rate Wireless Personal Area Networks," IEEE 2001, www.comsoc.org, 15 pages.

Mangold, Stefan, et al., "IEEE 802.11e Wireless LAN for Quality of Service," Proceedings of the European Wireless, Florence, Italy, Feb. 2002, 10 pages.

\* cited by examiner

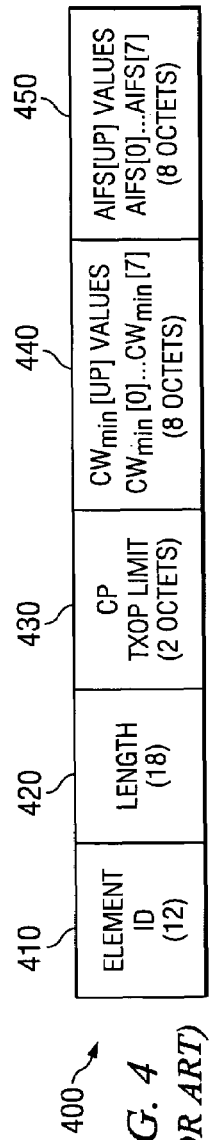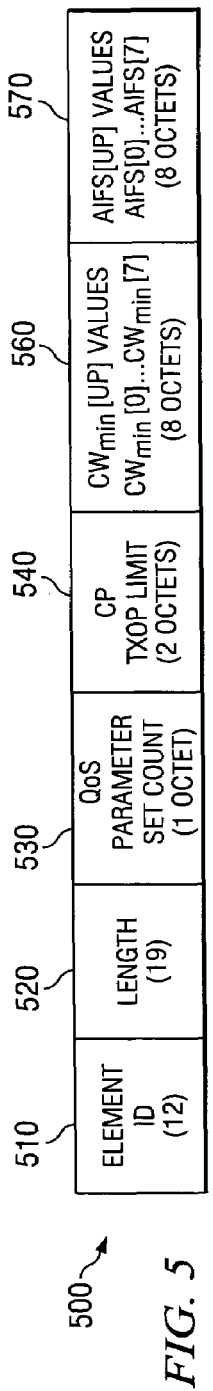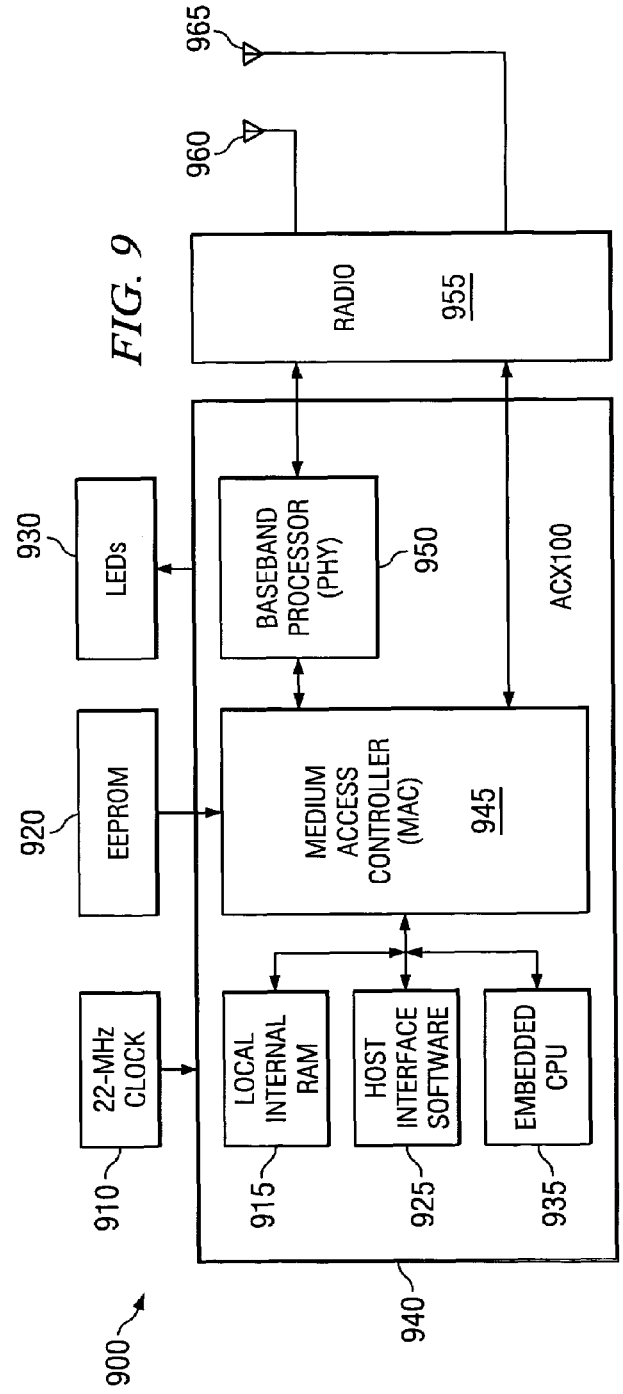

DYNAMIC UPDATE OF QUALITY OF SERVICE (QOS) PARAMETER SET

CROSS-REFERENCES TO RELATED APPLICATIONS

This application claims the benefit, under 35 U.S.C. §119(e)(1), of U.S. Provisional Application No. 60/379,502 (TI-34563PS), filed May 10, 2002, and incorporated herein by this reference.

BACKGROUND OF THE INVENTION

Field of the Invention

This invention pertains generally to the field of wireless local area networks (WLANs), and in particular, to a WLAN with enhanced transmit and receive functions to efficiently store and transmit data to mobile stations.

The architecture of a WLAN, as described in IEEE 802.11, is made up of a group of associated stations that pass information amongst themselves and, in certain architectures, to stations in other LANs, through an access point (AP). When all the stations are wireless (i.e., there is no connection to a wired network), the architecture is described as an independent basic service set (IBSS). When there is at least one station in the BSS connected to a wired network, the architecture is described as an infrastructure BSS, but is simply referred to as a BSS for convenience. The station connected to the wired network, and thus providing access to the wired network for all other stations in the IBSS, is the AP. Station services, whether the architecture is IBSS or BSS, include authentication, deauthentication, privacy, and data delivery. In addition to the provision of station services, the AP also provides distribution services which include association, disassociation, reassociation, distribution, and integration.

Each station includes a medium access control (MAC) layer, for managing transmissions between higher layers and access to the medium, and a physical (PHY) layer, for making a physical connecting to the communications medium. The basic WLAN defined by the IEEE 802.11 standard provides 1 or 2 Mbps transmission in the 2.4 GHz band and uses either frequency hopping spread spectrum (FHSS) or direct sequence spread spectrum (DSSS) modulation. Various extensions to the IEEE 802.11 standard, such as IEEE 802.11a, 802.11b, and 802.11g, provide for enhanced features and functionality to the basic WLAN. IEEE 802.11a defines a PHY that operates in the unlicensed 5 GHz band, provides up to 54 Mbps throughput, and includes a single carrier modulated using an orthogonal frequency division multiplexing (OFDM) encoding scheme. IEEE 802.11b defines a PHY that operates in the unlicensed 2.4 GHz band, provides 11 Mbps transmission, and uses DSSS encoding. The third extension, IEEE 802.11g, provides 20+ Mbps transmission, operates in the 2.4 GHz unlicensed band, and represents a compromise between IEEE 802.11a and IEEE 802.11b by providing for mandatory OFDM and optional packet binary convolutional coding (PBCC) encoding schemes. In an IEEE 802.11a, 802.11.b or 802.11.g compliant WLAN, the physical communications medium is through the air using radio frequency (RF) signals or infrared (IF) signals.

FIG. 1 shows an exemplary architecture of a WLAN management entity. The MAC 110 and PHY 120 communicate with a higher level station management entity (SME) 150 through a MAC layer management entity (MLME) 130 and a PHY layer management entity (PLME) 140, respectively. Both the MLME and the PLME include a data structure called a management information base (MIB), specifically MAC MIB 135 and PHY MIB 145. The MIB includes objects, some of which provide status information in response to queries, and others cause certain actions to take place. For an 802.11-compliant network, the MAC MIB 135 is described in detail in Annex D of the IEEE 802.11 specification. As shown in FIG. 2, in addition to MAC attributes 220 and PHY attributes 240, the MIB also includes objects defining station management and local configuration 210 and objects defining available resources 230.

The exchange of data is managed by the MAC using a frame exchange protocol to provide fair access to the shared wireless medium using either a distributed coordination function (DCF) or a point coordination function (PCF) and protects data transmissions using either a legacy protocol referred to as Wired Equivalent protocol (WEP) or the recently adopted security protocol, IEEE 802.11i, known as Wi-Fi Protected Access (WPA), which is part of an amendment to the IEEE 802.11i draft security standard.

As shown in the diagram in FIG. 3, IEEE 802.11 defines a series of repeated transmission periods each of which includes the transmission of a broadcasted beacon frame 310 followed by a contention-free period 320 which is in turn followed by a contention period 330. In accordance with the IEEE 802.11 standard, the contention period 330 must be long enough for a STA to transmit at least one MAC service data unit ("MSDU"), which can be up to 2047 bytes in length. The PCF manages transmission across the medium during the contention free period 320 in which each STA is polled in turn by the AP (which includes the PCF) to determine if the STA has data to transmit. The DCF manages the transmission of data during the contention period 330 in which each STA contends with every other STA for an opportunity to transmit data across the network.

Collisions, which would inevitably occur, are avoided in an IEEE 802.11 compliant transmission system using two mechanisms. One is a physical carrier sensing mechanism based on a protocol known as carrier sense multiple access/ collision avoidance (CSMA/CA) where each STA "listens" for traffic on the network medium before attempting to send. The second mechanism is a virtual one implemented using a network allocation vector (NAV) which is a counter maintained by the AP and indicates when a current transmission on the medium is scheduled to complete. Thus, if the NAV is set to zero and the medium is sensed to be clear for a predefined period of time, then the STA can begin transmitting data.

If the transmission is successful, i.e., the transmitting STA receives an acknowledgement (ACK) frame from the receiving STA within the required time period, then except in a very limited number of circumstances, the STA waits another predetermined period of time before transmitting the next frame. If the transmission is unsuccessful, i.e., no ACK frame is received by the transmitting STA within the required time period, then the STA must wait for a randomly selected multiple of a predetermined backoff window period before attempting the transmission again. After each unsuccessful transmission, the window period is doubled until it reaches a maximum value. After each successful transmission, the window period is reset to its minimum value.

Every 802.11 MAC frame includes a MAC header which comprises a frame control field (which includes information indicating the 802.11 protocol version), duration/ID field (which is set to 32,768 for operation during a contention-free period and is otherwise used to update the network allocation vector), four address fields which are used to indicate the BSS ID, source address, destination address, and receiving station address; and a sequence control field. In addition to the MAC header, each 802.11 MAC frame includes a variable length frame body, which contains information specific to the frame type, and a frame check sequence (FCS), which contains an IEEE 32-bit cyclic redundancy code. The frame control field in the 802.11 MAC header includes a frame type and various indicators such as whether WEP is enabled, whether power management is active, etc.

Management, control, and data frames are the basic 802.11 MAC frame types. Management frame subtypes include authentication, deauthentication, association request, association response, reassociation request, reassociation response, disassociation, beacon, probe request, and probe response frames. Control frame subtypes include request to sent (RTS), clear to send (CTS), and acknowledgement (ACK) frames. No frame subtypes are defined for the data frame.

One particular management frame, the beacon frame, is periodically transmitted by each AP to provide information that enables STAs to communicate with that AP. The STAs, in turn, constantly scan the communications medium for beacon signals and uses the information provided in the beacon signals to choose the AP with which to associate. Thus, if a STA moves out of range of its currently associated AP, and can no longer communicate with the WLAN, the station selects another AP with which to associate based on the detected beacon signals and sends a reassociation request frame to the new AP. The new AP then coordinates the forwarding of data frames, if any, destined for the roaming station and buffered by the previously associated AP. Alternatively, a STA may periodically transmit a probe request frame requesting data from APs that are within range of the station and with which the station may associate. In response to the probe request frame, an AP transmits a probe response frame, which includes information similar to that in the beacon frame, indicating its capabilities to the STA.

The beacon frame 310 includes three fixed length fields, a 64-bit timestamp, a 16-bit beacon interval, and a 16-bit capability information field. As noted above, MAC frames may also include variable length fields which are called information elements (IEs). The IEs included in the beacon frame 310 include a service set identity (SSID), a supported rates, one or more PHY parameter sets, a contention free parameter set, an IBSS parameter set, and a traffic indication map (TIM). The probe response frame includes all of the elements of the beacon frame 310 except for the TIM.

While transmissions on a WLAN, and LANs in general, have primarily consisted of data communication, more recent changes are focused on the increasing need for reliable transmission of video and audio data as well as to support time-sensitive and potentially bandwidth intensive applications such as video-on-demand. These newer applications require timely transmissions free from noise and jitter for successful deployment. Mechanism to improve transmissions over the WLAN are called quality of service (QoS) enhancements and are defined in a relatively new addition to the 802.11 family of standards referred to as IEEE 802.11e. The QoS enhancements take the form of various modifications to certain aspects of the operation of an 802.11 compliant WLAN.

In particular, the IEEE 802.11e QoS requirements introduce contention for transmission bandwidth within each individual station (STA). Data is transmitted through multiple backoff instances based on various user defined traffic categories (TCs) in a QoS parameter set provided to the STA by the AP as an IE in either a beacon or probe response frame. FIG. 4 shows an exemplary prior art QoS IE 400. The fields in the QoS IE 400 include an element ID 410, length 420, and contention period (CP) transmission opportunity (TXOP) limit 430. The element ID 410 is a 12 octet field identifying the particular IE. The length field 420 indicates the total length, in octets of the QoS IE 400. The CP TXOP limit field 430 is two (2) octets in length and indicates the maximum amount of time any particular one of the traffic categories (TCs) within a STA may transmit data.

The QoS IE 400 also includes two multi-component elements (i.e., an array, table, or object) indexed by user priority (UP) values. The first, CWmin[UP], defines a minimum window size for a particular TC. The second, AIFS [UP], defines a minimum delay period, called an arbitration interframe space (AIFS), for each TC that indicates the time that the particular TC must wait before attempting to transmit after sensing that the medium is idle. After the AIFS period expires, the TC within the STA then waits for a backoff period randomly selected from the range [1, (CW+ 1)] slot periods, where the maximum value for CW is the value in CWmin[UP]. In IEE 802.11a, for example, a slot period is equal to nine microseconds (9 μs). Both the CWmin[UP] and the AIFS[UP] parameters are eight (8) octets in length.

One problem that needs to be addressed, however, is an efficient mechanism for the deployment of QoS requirements to all STAs in the WLAN so that all transmissions are made in accordance with the new QoS requirements as soon as possible. Furthermore in order to simplify implementations, a simple mechanism is needed for STAs to determine whether QoS requirements have changed, so they can respond accordingly.

BRIEF SUMMARY OF THE INVENTION

The present invention includes an improved system, method and apparatus for dynamic notification, update and implementation of QoS change requirements in a WLAN. The present invention includes method of providing improved quality of service in a wireless local area network transmission system, the network comprising at least two devices, the quality of services defined at least in part by data communicated by a first of the devices to other devices in the network through one or more quality of service parameters, the method comprising the steps of initializing a change indicator at the start of a monitoring period; and, during the monitoring period, monitoring the stored parameters for changes in the stored parameters that define the quality of service, updating the change indicator in response to the monitoring step, and periodically notifying the other devices in the network of the change indicator, the other devices operable to update locally stored quality of service parameters in response to detecting a change in the change indicator.

These and other features of the invention that will be apparent to those skilled in the art from the following detailed description of the invention, taken together with the accompanying drawings.

DESCRIPTION OF THE SEVERAL VIEWS OF THE DRAWINGS

FIG. 4 depicts the format of an information element portion of a management frame an MIB;

FIG. 5 shows the format of an information element portion of a management frame an MIB in accordance with the present invention;

FIG. 9 shows an exemplary transceiver device operable to implement the present invention.

DETAILED DESCRIPTION OF THE INVENTION

Figure 1:
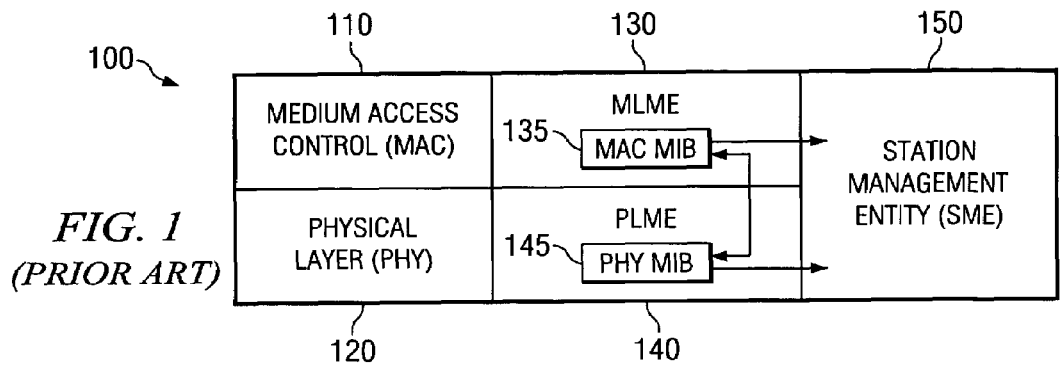
FIG. 1 is a block diagram illustrating an exemplary management architecture of a device suitable for deployment in a WLAN environment.
Figure 2:
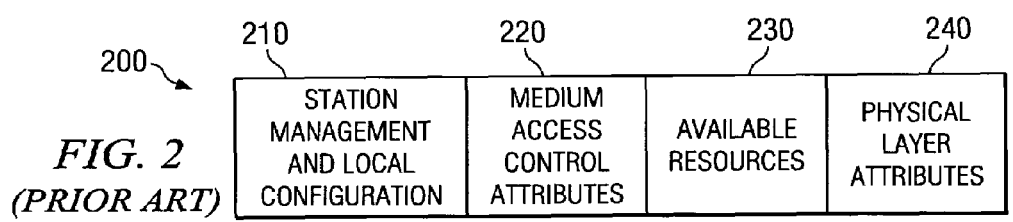
FIG. 2 is shows a high level diagram of the components in a management information base (MIB) for use by a management entity in a WLAN.
Figure 3:
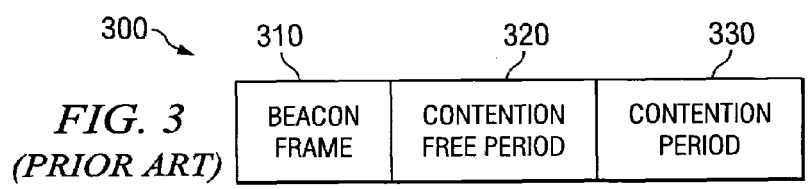
FIG. 3 illustrates one mode of operation, in block diagram format, of a WLAN.

The instant invention provides improved management mechanisms for STAs that are compliant with the IEEE 802.11e QoS protocols (QSTAs). These improved mechanisms allow dynamic notification, update and implementation of changes in the QoS parameters to QSTAs within the WLAN.

FIG. 5 shows an exemplary QoS parameter set IE 500 in accordance with the present invention. The QoS parameter set IE 500 provides information needed by QSTAs for proper operation of the QoS facility during contention periods. The instant invention includes the addition of a QoS parameter set count 530 the QoS parameter set IE 500. The QoS parameter set count 530 is a one (1) octet value that increases the length 520 of the QoS parameter set IE 500 to nineteen (19) octets. The QoS parameter set count 530 is initialized to zero and incremented by one each time the QoS parameter set changes. Thus, the QoS parameter set count 530 field is used by a QSTA to determine whether or not the QoS parameter set values have changed, thus requiring update of the appropriate MIB values.

The QSTA initializes and stores a local QoS parameter set count indicating the value of the QoS parameter set count received from the QAP, when the QSTA associated (or reassociated) with the QAP. Thereafter, upon receipt of a beacon frame or a probe response frame from the QAP, the QSTA compares the value of the QoS parameter set count 530 with the locally stored QoS parameter set count and, if changed, serves as a notification to the QSTA that changes to the QoS parameter set 500 elements have been made. In response, the QSTA updates its locally stored QoS parameter set count and updates the appropriate QoS parameter set elements stored in its MIB. In particular, in response to a change notification, the QSTA updates the dot11CWmin [UP] MIB values according to the CWmin[UP] values 550 in the most recent QoS parameter set IE 500 received. The updated CWmin[UP] values 550 are then used for all transmissions following the reception of the updated QoS parameter set IE 500.

Similarly, in response to a change notification, the QSTA updates the dot11AIFS[UP] MIB values according to the AIFS[UP] values 560 in the most recent QoS parameter set IE 500 received. The updated AIFS[UP] values 560 are then used for all transmissions following the reception of the updated QoS parameter set IE 500.

Figure 6:
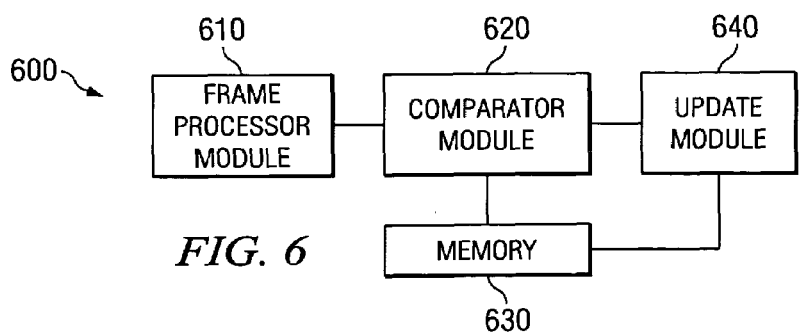
FIG. 6 is a block diagram of an exemplary portion of a management entity processor in accordance with the present invention.

FIG. 6 is a block diagram of an exemplary portion of a management entity processor in accordance with the present invention. The exemplary management entity processor 600 includes a frame processor module 610, a comparator module 620, an update module 640 and memory 630. The frame processor module 610 is operably connected to the comparator module 620. The comparator module 620 is operably connected to the update module 640 and to the memory 630. Update module 640 is operably connected to both the comparator module 620 and the memory 630. In one embodiment of the present invention, the management entity processor is implemented as a quality of service coordinator located in each STA and AP that operate in compliance with IEEE 802.11e.

Figure 7:
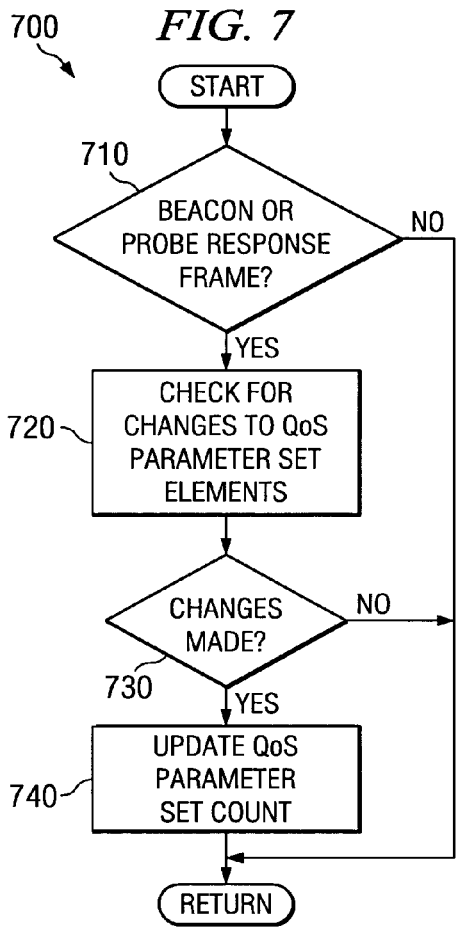
FIG. 7 shows a flow diagram of the operation of an access point (AP) operating in accordance with the present invention.

FIG. 7 is a flow diagram illustrating operation of an exemplary portion of the management entity processor 600 shown in FIG. 6 in the QAP which transmits the initial and updated QoS parameter set elements in beacon and probe response frames to QSTAs within its QBSS. As shown at decision block 710, if frame processor module 610 determines that the type of frame to be transmitted is of the type that would include one or more of the QoS parameter set elements, i.e. a beacon frame or a probe response frame, then processing continues at block 720. If the QAP is not preparing either of these frame types, processing by this portion of the management entity processor 600 terminates. At block 720, the comparator module 620 checks for changes to the QoS parameter set elements in the MIB of the QSTA by comparing the QoS parameter set elements stored in memory 630 to the QoS parameter set elements stored in the MIB. If the values are different, indicating that a change has been made to the QoS parameter set elements stored in the MIB of the QAP, then, as shown in decision block 730, operation continues to block 740. At block 740, the update module 640 of the QAP then updates the QoS parameter set count value stored either as an element in the MIB or in a portion of memory 630. This updated QoS parameter set count is then used by the frame processor module 610 in constructing the beacon or probe response frame in preparation for transmission.

Figure 8:
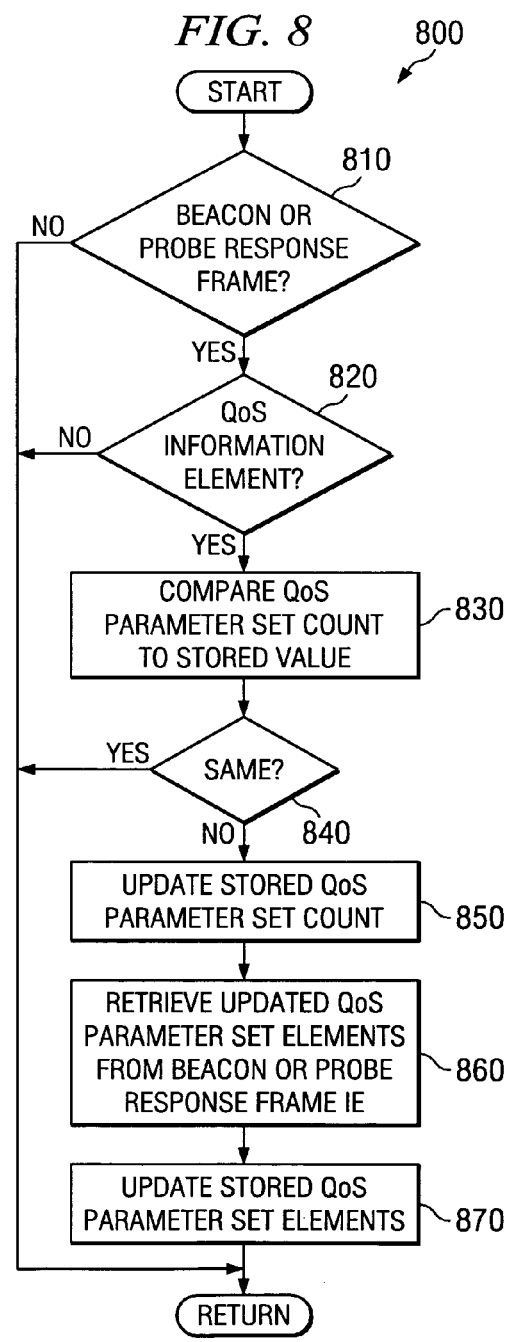
FIG. 8 illustrates a flow diagram of the operation of a station (STA) operating in accordance with the instant invention.

The flow diagram in FIG. 8 illustrates the operation of the management entity processor 600 in a QSTA upon receipt of either the beacon or probe response frame from the QAP. If frame processor module 610 determines at decision block 810 that the frame received is of the type that would include one or more of the QoS parameter set elements, i.e. a beacon frame or a probe response frame, then processing continues at block 820. If frame received in the QSTA is not either of these frame types, processing by this portion of the management entity processor 600 terminates. At block 820, the comparator module 620 checks for a QoS information element 500 in the received beacon or probe response frame. If a QoS information element 500 is received, then processing continues at block 830 where the comparator module 620 compares the QoS parameter set count 530 in the received QoS information element 500 to the value stored in memory 630 or in the MIB of the QSTA. If, at decision block 840 the comparator module 620 determines that the values are not the same, indicating that a change has been made to the QoS parameter set elements included in the QoS information element 500, then operation continues to block 850. At block 850, the update module 640 of the QSTA then updates the QoS parameter set count value stored either as an element in the MIB or in a portion of memory 630. In addition, update module 640 retrieves the updated QoS parameter set elements from the received QoS information element 500 at block 860. These updated QoS parameter set elements are then used at block 870 to update the QoS parameter set elements stored in the MIB of the QSTA. Once stored in the MIB of the QSTA, all further transmissions by the QSTA are in accordance with the updated QoS parameter set values.

FIG. 9 shows an exemplary transceiver device 900 in the form factor of a PC card and operable to implement the present invention. The exemplary transceiver device 900 includes a clock 910 for providing timing signals to module 940. Module 940 is also connected to EEPROM 920 from which certain initialization and other data is read by MAC 945. Module 940 also includes LEDs 930 for providing indication signals to a user. In addition to MAC 945, module 940 also includes baseband processor (PHY) 950 which is operably connected to the MAC 945. Both the PHY 950 and MAC 945 are bi-directionally connected to radio 955. The radio 955 is connected to dual antennas 960 and 965 for transmitting the RF signals generated by module 940 and receiving other RF signals transmitted by other transmitter devices. As further shown in FIG. 9, the module 940 also includes local internal RAM 915, host interface software 925 and embedded CPU 935 each of which are bi-directionally connected to the MAC 945.

Although module 940 shows the MAC 945 and PHY 950 resident on a single device, other implementations would be apparent to one skilled in the art. In addition, although shown resident on module 940, any of the local internal RAM 915, the host interface software 925 and the embedded CPU 935 may instead be external to module 940.

OTHER EMBODIMENTS

Although the present invention and its advantages have been described in detail, it should be understood that various changes, substitutions and alterations can be made herein without departing from the spirit and scope of the invention as defined by the appended claims.

What is claimed is:

1. A method of providing improved quality of service in a wireless local area network transmission system, the network comprising at least two devices, the quality of services defined at least in part by data communicated by a first of the devices to other devices in the network through one or more quality of service parameters, the method comprising:
   initializing a change indicator at the start of a monitoring period;
   during the monitoring period:
      monitoring the stored parameters for changes in the stored parameters that define the quality of service;
      updating the change indicator in response to the monitoring change in the stored parameters that define the quality of service;
      periodically notifying the other devices in the network of the change indicator, the other devices operable to update locally stored quality of service parameters in response to detecting a change in the change indicator, said updating locally stored quality of service parameters to be preformed for no longer than a predefined time period after the reception of the new change indicator.

2. A method of providing improved quality of service in a wireless local area network transmission system, the network comprising at least two devices, the quality of services defined at least in part by data communicated by a first of the devices to all other devices in the network through one or more stored parameters, the method comprising:
   initializing a change indicator at the start of operation;
   storing the change indicator a monitoring period;
   repeatedly during the monitoring period:
      monitoring the received change indicator for changes in the quality of service requirements;
      comparing the received change indicator to the most recently stored updating the change indicator in response to the monitoring step;
      in response to detecting a change in the change indicator, updating the stored quality of service parameters, and storing the new change indicator, said updating stored quality of service parameters to be preformed for no longer than a predefined time period after the reception of the new change indicator.

3. A method of providing improved quality of service in a wireless local area network transmission system, according to claim 1 wherein the method is performed by a quality of service coordinator.

4. A method of providing improved quality of service in a wireless local area network transmission system, according to claim 2 wherein the method is performed by a client in the network.

5. Apparatus for providing improved quality of service in a wireless local area network transmission system, the network comprising at least two devices, the quality of services defined at least in part by data communicated by a first of the devices to all other devices in the network through one or more stored parameters, the apparatus comprising:
   a quality of service coordinator for initializing a change indicator at the start of operation;
   memory for storing the change indicator during a monitoring period;
   the quality of service coordinator operable during the monitoring period and further comprising:
      a frame processor for monitor the received change indicator for changes in the quality of service requirements;
      a comparator for comparing the received change indicator to the most recently stored updating the change indicator in response to the monitoring step;
      an updator operable, in response to detecting a change in the change indicator, to update the stored quality of service parameters, and to store the new change indicator, wherein the update of the quality of service parameters is performed for no longer than a predefined time period after the reception of the new change indicator.

6. The apparatus according to claim 5 wherein the quality of service coordinator is an IEEE 802.11 compliant access point (AP).

7. The apparatus according to claim 5 wherein the quality of service coordinator is an IEEE 802.11e compliant hybrid coordinator (HC).

8. The apparatus according to claim 5 wherein the apparatus is a client in the network.

9. The apparatus according to claim 8 wherein the client is an IEEE802.11 compliant station (STA).

10. An apparatus according to claim 8 wherein the client is an IEEE 802.11e compliant quality of service station (QSTA).

* * * * *